United States Patent [19]

Petty

[11] Patent Number: 4,847,997
[45] Date of Patent: Jul. 18, 1989

[54] TUBING CUTTERS

[76] Inventor: Troy Petty, 904 Cardinal, Rogers, Ark. 72756

[21] Appl. No.: 84,375

[22] Filed: Aug. 11, 1987

[51] Int. Cl.$^4$ .............................................. B23D 21/06
[52] U.S. Cl. .......................................... 30/95; 30/102; 7/157
[58] Field of Search ................... 30/90.3, 91.2, 94, 95, 30/101, 102; 72/409, 415; 7/157

[56] References Cited

U.S. PATENT DOCUMENTS

| | | | |
|---|---|---|---|
| 862,049 | 7/1907 | Booth | 30/102 |
| 1,672,642 | 6/1928 | Hemphill | 30/95 X |
| 2,961,765 | 11/1960 | Brooks | 30/102 |
| 3,025,597 | 3/1962 | Huglin | 30/102 X |
| 4,602,496 | 7/1986 | Wagener | 72/409 |

Primary Examiner—Frank T. Yost
Assistant Examiner—Michael D. Folkerts
Attorney, Agent, or Firm—Head & Johnson

[57] ABSTRACT

A tubing cutter having a first handle with a jaw-like element connected by a precision pivot point to a second handle with a second jaw-like element. The interior face of each jaw-like element is provided with a semicircular cutout. Each jaw-like element has two cutter wheels which are rotatable and extend into the opening. The tubing to be cut is placed in the opening and the handles are held forced toward each other and reciprocated back and forth approximately 90°.

2 Claims, 2 Drawing Sheets

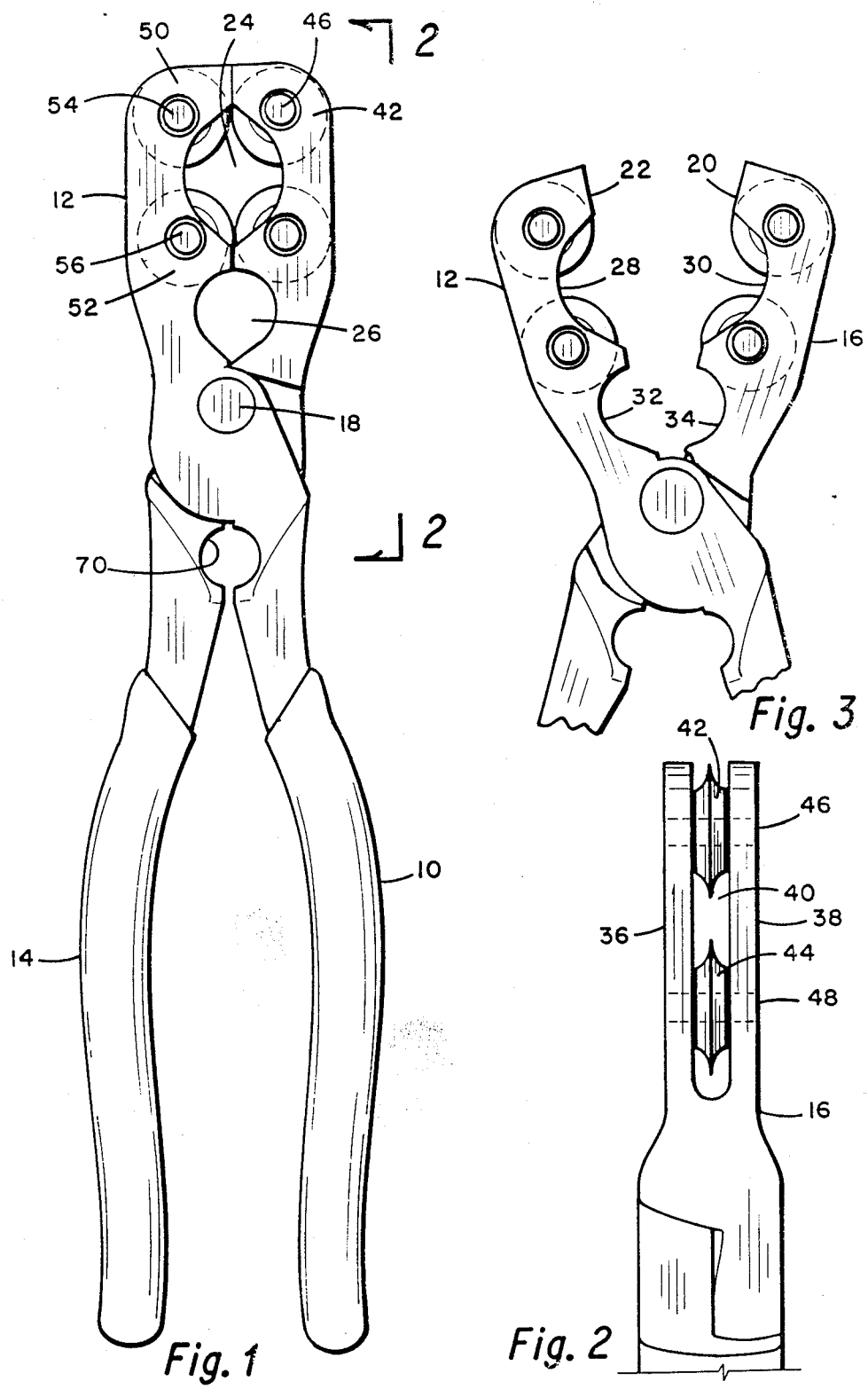

TUBING CUTTERS

DISCLOSURE STATEMENT

While no formal preliminary patentability search has been made I know of no prior disclosure showing the tubing cutters claimed in my application. Present commercial tubing cutters include a tool which has a rotatable sharp edge disc that contacts the tubing at the point at where it is to be cut and is rotated completely about the circumference of the tubing. As the disc cuts into the tubing a screw thread is tightened to force the disc further and further into the wall of the tubing until the tubing is cut into.

BACKGROUND OF THE INVENTION

This invention relates to tools for cutting tubing such as copper tubing used in plumbing.

Tubing is widely used to convey fluids from one location to another. These tubings can be made of various materials depending upon the material transported through the tubing. These materials include copper, aluminum, steel, and various plastics. Many times the tubing is to be cut at a selected point and connected to a second tubing or manifold fitting of some type. This is especially true in home constructions using a poured concrete slab floor. Before the floor is poured proper lengths of tubing such as copper tubing is laid on the ground and then extend upwardly to above the level of where the floor will be when poured. These ends of the tubings usually are required to be cut to a particular length so that appropriate fittings can be applied thereto for connection to other tubing or to various pipes or manifolds. These tubings are cut using commercially available tubing cutters which has a sharp rotatable wheel which is positioned against the tubing and then rotated 360° about the tubing. As the wheel cuts in it is a continually forced deeper and deeper by a screw type connection which has to be continually tightened as the cutter wheel is rotated around and around the tubing until the tubing cut has been made.

SUMMARY OF THE INVENTION

These tubing cutters are plier like. There is a first leg element having a first handle and a first jaw-like element and a second leg element having a second handle and a second jaw-like element. The leg elements are connected together by a precision pivot point. Each jaw-like element has a cut out section on its interface which generally may be semi-circular in shape. Each jaw element has two spaced apart cutter wheels which are rotatably supported by the jaw-like element and the cutter wheels extend into the semi-circular tube opening or mouth. In operation, the jaw-like element surrounds the tubing and each cutter wheel is in contact with the exterior wall of the tubing at the point to be cut. Force is applied on the two handles to force the cutter wheels against the tubing. The handles are then rotated approximately 90° or just slightly over 90°, e.g. 91° from one direction to the other so that the entire outer surface of the tubing is contacted. This reciprocation is continued until the tubing is cut into.

In a preferred embodiment each jaw-like element also has a semi-circular sizing hole which when put together make a circle. In operation after the tubing has been cut as just described above the tubing is placed in the two semi-circular sizing holes and the tool is then reciprocated several times until the tubing has been forced into its circular configuration so that proper fittings can be placed thereon and function as intended.

In another embodiment the interior of each handle adjacent the pivot but on the opposite side from the first sizing hole is provided with a second sizing hole of a different diameter from the first sizing hole.

It is thus an object of this invention to provide a new tool for cutting tubing. It is a further object of this invention to provide a tool that can cut the tubing by being reciprocated about 90° to facilitate cutting when the tubing is close to a bulkhead.

BRIEF DESCRIPTION OF THE DRAWINGS

FIG. 1 is a full face view of the QUICK CUT TM tube cutter of my invention with the jaw elements closed.

FIG. 2 is a view taken along the line 2—2 of FIG. 1.

FIG. 3 shows the jaw elements of FIG. 1 in an open position.

In FIG. 4 the cutter wheels have just been forced into contact with the tubing. In FIG. 5 the cutter wheels have been reciprocated back and forth to have the tubing nearly cut into and in FIG. 6 the cutter wheels have extended all the way through the tubing wall.

DETAILED DESCRIPTION OF THE INVENTION

Figure 4:
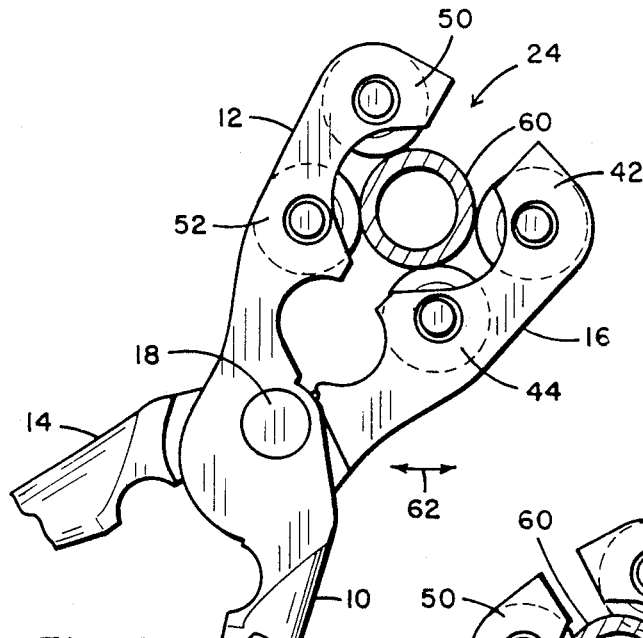
FIGS. 4, 5 and 6 are segmented views showing the jaw elements with cutter wheels contacting a tubing to be cut.

Attention is first directed to FIGS. 1, 2 and 3 which show a plier like QUICK-CUT TM tube cutter. Shown in FIG. 1 is a first leg having an insulated handle 10 with a jaw element 12 and a second leg having an insulated handle 14 and a jaw element 16. These two legs are joined by a precision pivot point 18.

As shown in FIG. 3 jaw element 12 has an interior face 22 and jaw element 16 has an interior face 20. As shown in FIG. 1 when the two faces 22 and 20 are together there is a tube receiving mouth 24 and space between that hole 24 and pivot 18 is a sizing hole 26. The tube receiving mouth 24 is made by cutting a concave section 28 in face 22 and a concave section 30 in face 20. As shown in FIG. 2, jaw 16 includes a first flat finger 36 and a second spaced apart flat finger 38 with a space 40 therebetween for receiving cutter wheels 42 and 44. Wheel 42 is held in position by pin 46 and wheel 44 is held in position by pin 48. One end of the pins has a head and the other end is secured by an E-clip. Jaw 12 likewise contains a cutter wheel 50 and a second cutter wheel 52 which corresponds to cutter wheels 42 and 44 of jaw element 16.

A tube cutter such as shown in FIGS. 1, 2 and 3 has been made and in that the centers of pins 46, 48, 54 and 56 define a rectangle. The distance between center of pin 54 and 56 and between pin 46 and 48 were the same and was 7/8 inch. The distance between the center of pins 54 and 46 and the distance between pin 56 and 48 were also identical and was ¾ of an inch. Making these centers in this manner permitted the tool to cut both ½" and ¾" copper tubing which is the most common sizes used in home construction. The outside diameter of these ½" and ¾" tubings are respectively ⅝" and ⅞". The tube receiving hole or mouth 24 is preferably circular in shape when the cutter is closed in the fraction shown in FIG. 1. However, it may be slightly elliptically shaped. The cutter wheels 42, 44, 50 and 52 are of sufficient diameter to enter the tube receiving hole 24 and have a large enough dimension to cut through the wall of the tubing being cut.

Figure 5:
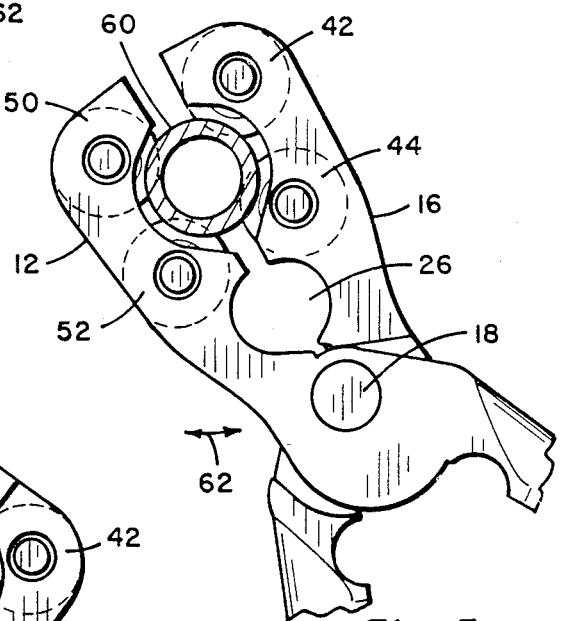
Figure 6:
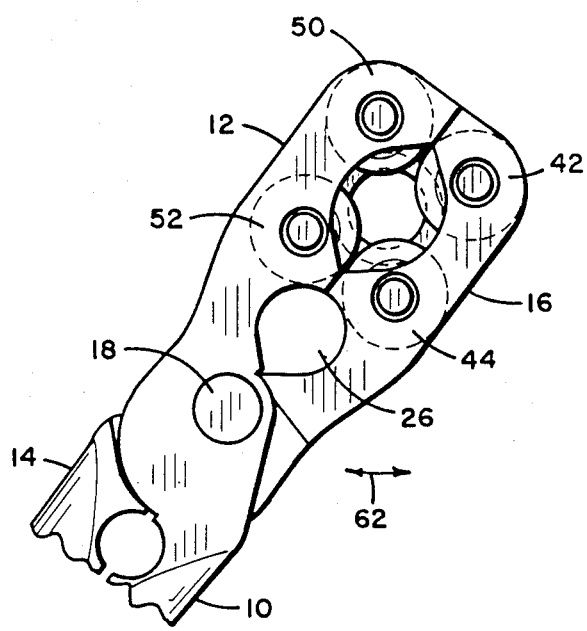

Attention is next directed to FIGS. 4, 5 and 6 to illustrate the cutting of a tubing. Attention is first directed to FIG. 4 which shows a tubing section 60 inserted into mouth 24. The handles 10 and 14 are then gripped together so that cutter wheels 50, 52, 42 and 44 contact the outer wall of tubing 60. The tube cutter is then reciprocated as indicated by arrow 62 in approximately a 90° arc. It is desirable to rotate it in about 91° so that there will be a complete cut around the entire circumference of the tubing 60. This tube cutter can be held in one hand and reciprocated as indicated. Continued reciprocation causes the wheels to take the position shown in FIG. 5 wherein the tubing 60 is nearly cut completely into. This reciprocation of the tube cutter is continued until the wheels have completely penetrated tubing 60 and has cut it into as shown in FIG. 6. The main criteria for the spacing of the cutting wheels is that the wheel contact the tubing so that they may contact the tubing properly to cut it.

After the tubing has been cut as just described it is usually desirable that the tubing be sized. I accomplish this by inserting the tubing in sizing hole 26 and reciprocating the tube cutter until proper sizing of the tubing has been obtained. The sizing hole 26 is circular or the same configuration as the tubing is supposed to be and is of approximately the same diameter as the outside diameter of the tubing. Thus, for a $\frac{3}{4}$" tubing which normally has an outside diameter of $\frac{7}{8}$" the diameter of the hole 26 would be $\frac{7}{8}$".

It is believed apparent that there are many advantages to my tube cutter. For example, by having four cutter wheel, only a 90° arc of reciprocation is required for complete contact of the four cutting wheels about the surface of the tube. Also, as pointed out above, it can be a one handed operation. I can also work very close to a bulkhead. If the tubing which is to be cut is next to a wall then I can cut up to a very close tolerance to the wall because I do not have to reciprocate 360°, I merely have to reciprocate 90° and so I can therefore get quite close to it. Sometimes when 360° is required by the cutting tool the tubing has to be bend before it can be cut. I prevent this bending in most cases. Also in cutting all I do is apply force to the two handles with my hand as I reciprocate the cutter wheels about the wall of the tubing. I do not have to stop and hand adjust the position of a cutting wheel by screwing in on a lever. This single tube cutter provides tube cutting, sizing, truing, reshaping and displacement of burrs in preparation for easy installation of fittings. I also increase the cutting speed by approximately four times over contentional one wheel cutters. Other advantages are that I have replacable cutting wheels, replacable hardened pins, precision point of pivot to assure proper alignment of wheels, forged cast construction for maximum strength, and cut off dimension ranges from $\frac{1}{4}$" to infinity.

If desired I can modify FIG. 1 to have a second sizing hole 70 which is made by cutting concave sections of handles 10 and 14 on the opposite side of pivot 18 from sizing hole 26. The sizing hole 70 would be different from the sizing hole 26. For example, if sizing hole 26 were $\frac{7}{8}$" in diameter then sizing hole 70 could be $\frac{5}{8}$". Thus the tool as described above with the dimensions indicated could be used to cut and size both $\frac{1}{2}$" and $\frac{3}{4}$" tubing.

While the invention has been described with a certain degree of particularity, it is manifest that many changes may be made in the details of construction and the arrangement of components without departing from the spirit and scope of this disclosure. For example, only three cutting wheels, two on one jaw and one on the other might be used but the required angle of reciprocation would increase to 120°. It is understood that the invention is not limited to the embodiments set forth herein for purposes of exemplification, but is to be limited only by the scope of the attached claim or claims, including the full range of equivalency to which each element thereof is entitled.

What I claim is:

1. A tube cutter for cutting tubing which comprises:
   a first leg element having a first handle and a first jaw element;
   a second leg element having a second handle and a second jaw element;
   each said jaw element having a face with a concave section;
   a pivot for connecting said first and second leg elements such that the concave sections of the first and second jaw element form a tube receiving mouth when the faces of said first and second jaw element approach each other, said jaw elements may be rotated about said pivot until contact is made;
   a plurality of cutter wheels rotatably supported by said jaw elements which extend into said tube receiving mouth, each said jaw element having two spaced apart cutter wheels whose center, which when the jaw elements contact, define a rectangle other than a square;
   a sizing hole of smooth surface formed by mating concave sections in the faces of said first and second jaw element and spaced from said tube receiving mouth.

2. A tube cutter as defined in claim 1 including a second sizing hole provided in concave sections in said first and second handle on the side of said pivot opposite said first sizing hole.

* * * * *